United States Patent [19]

Brumm

[11] 4,193,578
[45] Mar. 18, 1980

[54] LOW TORQUE CONTROL VALVE

[75] Inventor: Richard S. Brumm, Orinda, Calif.

[73] Assignee: Cashco, Incorporated, Ellsworth, Kans.

[21] Appl. No.: 851,500

[22] Filed: Nov. 14, 1977

[51] Int. Cl.$^2$ .............................................. F16K 1/18
[52] U.S. Cl. ................................. 251/283; 251/298; 251/304
[58] Field of Search ............... 251/283, 298, 304, 309

[56] References Cited

U.S. PATENT DOCUMENTS

| 3,475,003 | 10/1969 | Paluszek | 251/283 |
| 3,937,441 | 2/1976 | Baumann | 251/298 |

FOREIGN PATENT DOCUMENTS

| 1600836 | 4/1970 | Fed. Rep. of Germany | 251/298 |
| 2553155 | 9/1976 | Fed. Rep. of Germany | |

*Primary Examiner*—William R. Cline
*Assistant Examiner*—H. Jay Spiegel
*Attorney, Agent, or Firm*—Melvin R. Stidham

[57] ABSTRACT

A rotary valve comprising a spherical segment supported on arms extending radially from aligned stub shafts. Carried by the arms is a vane which is circular in outline and of maximum thickness along the diameter parallel to the axis of the shaft, tapering to lesser thicknesses in both directions transverse of that diameter. In addition, the vane is tilted about the maximum thickness diameter in the rotary direction opposite to valve opening movement, so that it remains exposed to the flow stream through full movement of the plug. The flow stream acting against the vane biases the plug toward closed position, cancelling the effects of the flow stream acting against the plug itself.

6 Claims, 3 Drawing Figures

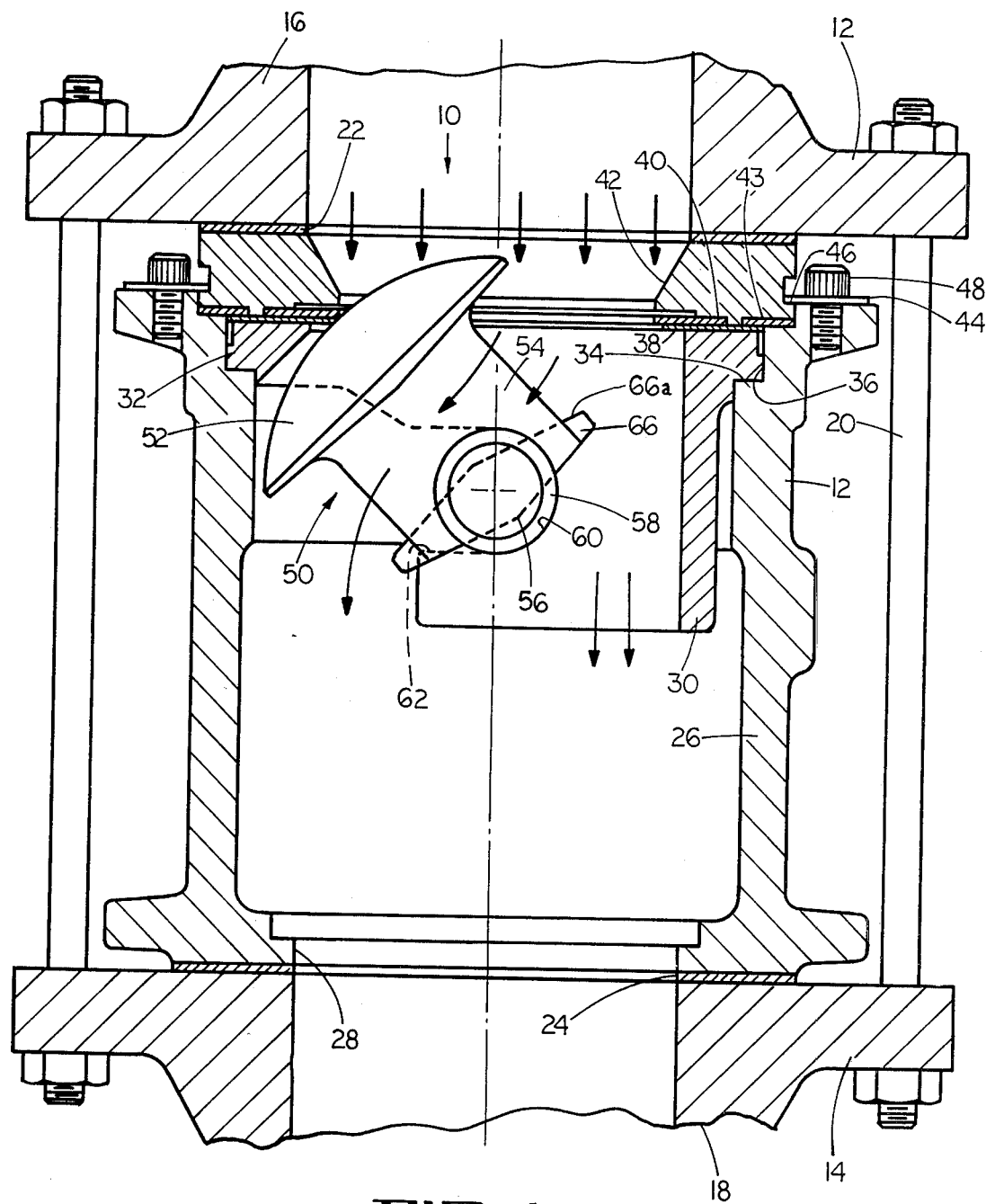
FIG-1-

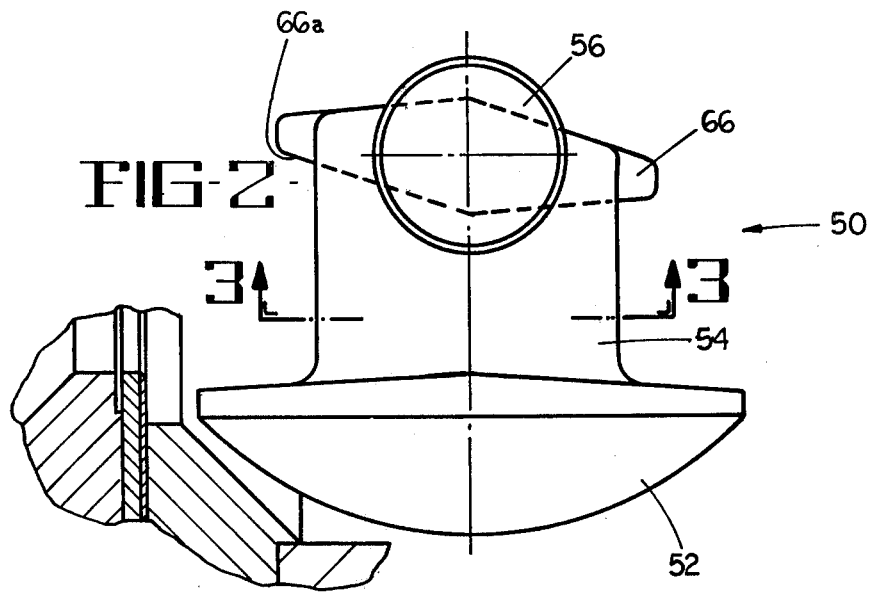
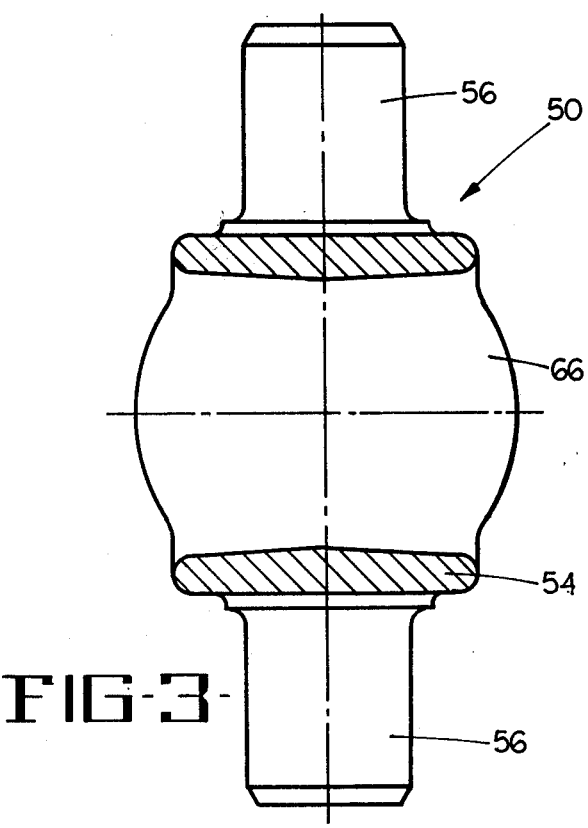

LOW TORQUE CONTROL VALVE

BACKGROUND OF THE INVENTION

Various rotary valves, such as ball valves have been used as control valves for fine control of fluid flow characteristics on a continuing basis as distinguished from conventional on and off operation. However, certain of such valves are difficult to turn and require a large, high torque actuator, maximizing cost and bulk. Costs have been reduced in some cases by minimizing the weight of a valve closure member, as by forming the plug as merely a segment of a sphere. However, the force of the flow stream acting against the plug still imposes certain torque loads which makes the desired close control difficult.

OBJECTS OF THE INVENTION

It is an object of this invention to provide a low torque control valve.

It is a further object of this invention to provide a control valve which is capable of fine control even under high pressure conditions.

Other objects and advantages of this invention will become apparent from the description to follow, particularly when read in conjunction with the accompanying drawings.

SUMMARY OF THE INVENTION

In carrying out this invention, there is provided a hollow valve body with stub shafts rotatably mounted therein. A pair of arms extend radially from the inner ends of the stub shafts and carry at their outer ends a sphere segment which is adapted to function in cooperation with an annular valve seat. Extending between the arms, on or above the axis of the stub shafts is a vane which is circular in outline and of maximum thickness along the diameter aligned with the axis of the stub shafts, and tapering in thickness in both directions transverse of that diameter. The vane is tilted about the maximum thickness diameter in the rotary direction opposite to the direction of opening movement, whereby it will be exposed to the flow stream parallel of the pipeline axis throughout the full valve opening movement. The flow stream impinging upon the tilted vane opposes the action of same stream impinging upon the spherical segment, whereby the effects of such impingement would tend to cancel each other out and greatly reduces the amount of torque required to pivot the sphere segment plug.

BRIEF DESCRIPTION OF THE DRAWINGS

In the drawings;

FIG. 1 is a vertical section view taken through a control valve embodying the features of this invention;

FIG. 2 is an enlarged partial section view of the valve; and

FIG. 3 is a section view taken along line 3—3 of FIG. 2.

DESCRIPTION OF A PREFERRED EMBODIMENT

Referring now to FIG. 1 with greater particularity, the low torque control valve of this invention 10 may, in use be clamped between the flanges 12 and 14 of two pipe sections 16 and 18 by means of studs 20, with suitable gaskets 22 and 24 providing end seals. The valve 10 may include a generally cylindrical, tubular body 26 having an outflow passage 28 which aligns and communicates with the adjacent pipeline 18.

At the upstream side a plug carrier cage 30 has an outer radial flange 32 which seats against the shoulder 34 formed by a counter bore 36 in the tubular body 26. A thin metallic seal ring 38 backed up by a slightly thicker plastic seal ring 40, are clamped between the plug support cage 30 and an upstream flow passage ring 42. Clamped between the upstream ring 42 and the valve body 12 is a gasket seal ring 43. Again, in use, the plug carrier support cage 30, the seal rings 38 and 40 and the upstream flow passage ring 42 are all held in place by being clamped between the pipe flanges 12 and 14. However, prior to installation such components may be assembled and held together by engagement of washers 44 against a shoulder 46 around the upstream flow passage ring, such washers being retained by cap screws 48.

The valve plug 50 has a spherical outer sealing surface 52 which, in closed position of the valve, engages circumferentially around the seal means 38 and 40. The sealing spherical segment 52 is carried on arms 54 which extend radially from stub shafts 56 (FIG. 3). The stub shafts are rotatably carried in bushings 58 which, in turn, are removably carried in aligned openings 60 in the plug support cage. When the bushings are removed axially from the openings 60, the stub shafts 56 are free to pass through exit openings 62 for ready removal and replacement of the plug 50. With the stub shafts 56 in place in the bushings they are conditioned to be rotated from outside the valve body 26 by suitable actuator means (not shown).

Hence, for field servicing, it is merely necessary to loosen the studs 20 and remove some of them so that the valve assembly 10 may be removed from between the flanges 12 and 14. Then, the upstream flow passage ring 42, gasket seal 43 and seal rings 38 and 40 may be removed. Then the plug carrier cage 30 may be removed from the cylindrical body 26 and if necessary, the plug 50 removed and replaced as above described.

Extending between the arms 54 to rigidify the structure greatly is a vane 66, perferably generally circular in outline (FIG. 3). When the valve plug 50 is rotated from its fully closed position, the flow stream impinging upon its spherical outer surface 52 biases the valve plug to rotate in a counter-clockwise direction in FIG. 1 towards its full open position. Simultaneously, the flow stream impinges upon the vane, and particularly the inner surface 66a of the trailing portions thereof relative to plug opening movement, to bias the valve plug to rotate in a clockwise direction, tending to cancel the forces acting against the spherical surface 52 and greatly reducing the amount of torque necessary to operate the valve 10. Further, this torque cancelling effect is maximized by tilting the vane in a direction opposite to valve opening movement, so that, as seen in FIG. 2, a substantial clockwise movement is achieved even when the valve plug is in its fully open position.

As seen in FIGS. 2 and 3 the vane 66 between arms 54, is generally circular in outline and is of maximum thickness along a diameter parallel to the axis of the stub shafts 56, tapering to a lesser thickness in both directions transverse to said axis. Then, the vane is tilted about that diameter in a direction opposite to valve opening rotation so that the inner or undersurface of the vane will be exposed to the flow stream during a greater segment of such opening movement.

The valve 10 of this invention is intended for use as a control valve and not an on-off valve, its normal operating range being in an angle between 10° and 85° from its fully closed position. In operation, it has been determined that a torque reversal occurs with the vaned construction. That is, through most of the operation, there is a positive torque biasing the valve 50 toward its closed position but that just prior to reaching its fully open position, with the vane 66 nearing alignment with the flow stream, the torque reverses to a rotary direction tending to bias the valve to its open position. This undesirable characteristic has been eliminated as a factor in this structure in that with the tilting of the vane 66 the tendency to reverse torque is delayed so that it does not occur in the operating range above described.

While this invention has been described in conjunction with a preferred embodiment thereof, it is obvious that modifications and changes may be made therein without departing from the spirit and scope of this invention, as defined by the claims appended hereto.

What is claimed as invention is:

1. A rotary valve comprising:
   a housing;
   means in said housing forming an upstream flow passagewas;
   a plug, circular in outline and having an upstream surface thereon extending across said passageway when in a maximum blocking position;
   sealing portions of said upstream surface being spherical;
   shaft means carried on said plug and rotatably mounted in said housing for turning said plug between said maximum blocking position and a full open position 90 degrees therefrom;
   said upstream surface being displaced from the axis of said shaft means so that a flow stream through said housing impinging thereon will bias said plug away toward said full open position through the full movement in any position thereof away from said maximum blocking position;
   a pair of arms extending generally radially from said shaft means supporting said plug; and
   a vane extending between said arms to be exposed to a flow stream through said housing;
   said vane being tilted about an axis parallel to the axis of said shaft means in the direction opposite to plug opening movement so that impingement of said flow stream thereon biases said plug away from said full open position in any position of said plug away from said maximum blocking position.

2. The rotary valve defined by claim 1 wherein:
   said plug is a segment of a sphere.

3. The rotary valve defined by claim 1 wherein:
   said vane is of generally circular outline and is of maximum thickness on a diameter parallel to the axis of said shaft means and tapers thinner in both directions transverse to said diameter;
   said vane being tilted about said diameter in the direction opposite to plug opening movement.

4. The rotary valve defined by claim 1 wherein:
   said upstream flow passageway is an annular member and including:
   seal means carried on said annular member to be engaged circumferentially by said sealing portions when said plug is in said maximum blocking position.

5. The rotary valve defined by claim 4 wherein:
   the inner surface of said vane on the trailing side thereof relative to valve movement slopes back sufficiently that it is transverse to flow parallel to the axis of said passageway through the full movement of said plug.

6. The rotary valve defined by claim 1 wherein:
   the inner surface of said vane on the trailing side thereof relative to valve opening movement slopes back from the middle thereof toward the periphery thereof sufficiently that it extends transverse to the flow path through said passageway through the full movement of said plug.

* * * * *